US 9,934,075 B2

United States Patent
Jung

(10) Patent No.: US 9,934,075 B2
(45) Date of Patent: Apr. 3, 2018

(54) MANAGING ASSOCIATED TASKS USING A TASK MANAGER IN COMMUNICATION DEVICES

(71) Applicant: Empire Technology Development LLC, Wilmington, DE (US)

(72) Inventor: Yang-Won Jung, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/375,902

(22) PCT Filed: Jun. 28, 2013

(86) PCT No.: PCT/US2013/048518
§ 371 (c)(1),
(2) Date: Jul. 31, 2014

(87) PCT Pub. No.: WO2014/209348
PCT Pub. Date: Dec. 31, 2014

(65) Prior Publication Data
US 2015/0339172 A1    Nov. 26, 2015

(51) Int. Cl.
*G06F 9/46* (2006.01)
*G06F 9/50* (2006.01)
*G06F 9/48* (2006.01)

(52) U.S. Cl.
CPC ............ *G06F 9/5088* (2013.01); *G06F 9/485* (2013.01); *G06F 9/4843* (2013.01)

(58) Field of Classification Search
None
See application file for complete search history.

(56) References Cited

U.S. PATENT DOCUMENTS 5,257,375 A * 10/1993 Clark .................... G06F 9/4812
                                                    712/244
5,812,843 A *  9/1998 Yamazaki ........... G06F 9/45537
                                                    709/201
(Continued)

FOREIGN PATENT DOCUMENTS

EP            1338968 B1    11/2009
JP         2004054633 A      2/2004
(Continued)

OTHER PUBLICATIONS

"Batch files that open multiple programs!," BBZS, accessed at http://web.archive.org/20130313184653/http://www.instructables.com/id/Batch-files-that-open-multiple-programs/, accessed on Jul. 18, 2014, pp. 1-4.

(Continued)

*Primary Examiner* — Wissam Rashid
(74) *Attorney, Agent, or Firm* — Brundidge & Stanger, P.C.

(57) ABSTRACT

Technologies are generally described for task management on computing platforms. In some examples, a method performed under control of a task management system may include determining a relationship among a plurality of tasks executed on a first platform to identify one or more associated tasks; identifying at least one attribute of each of the one or more associated tasks; generating a job that includes the one or more associated tasks and the identified at least one attribute of each of the one or more associated tasks; and instantiating, on a second platform, the one or more associated tasks included in the job based on the at least one attribute of each of the one or more associated tasks, in response to a request to launch the job.

19 Claims, 8 Drawing Sheets

(56) References Cited

U.S. PATENT DOCUMENTS

| | | | |
|---|---|---|---|
| 6,178,443 B1* | 1/2001 | Lin | H04L 29/06 707/999.104 |
| 6,438,586 B1* | 8/2002 | Hass | G06F 9/544 709/213 |
| 6,573,915 B1* | 6/2003 | Sivan | G09G 5/14 715/781 |
| 7,506,006 B2 | 3/2009 | Vadlamani et al. | |
| 2005/0091647 A1* | 4/2005 | McCollum | G06F 8/20 717/130 |
| 2006/0195508 A1* | 8/2006 | Bernardin | G06F 9/505 709/203 |
| 2010/0106687 A1 | 4/2010 | Marcy et al. | |
| 2012/0136925 A1 | 5/2012 | Horiuchi et al. | |
| 2013/0019250 A1* | 1/2013 | Ng | G06F 8/71 718/106 |
| 2013/0041790 A1* | 2/2013 | Murugesan | G06F 9/4856 705/30 |

FOREIGN PATENT DOCUMENTS

| | | |
|---|---|---|
| JP | 2012118674 A | 6/2012 |
| KR | 20020002937 A | 1/2002 |
| KR | 1020100107113 A | 10/2010 |

OTHER PUBLICATIONS

"How can I launch multiple apps at once?," accessed at http://web.archive.org/web/20130112005148/http://support.alfredapp.com/kb:launch-multiple, accessed on Jul. 18, 2014, p. 1.

International Search Report for International Application No. PCT/US13/48518, dated Jan. 14, 2014.

Kaufman, L., "How to Launch Multiple Apps at Once in Windows 7 With a Single Shortcut," accessed at http://www.howtogeek.com/102458/how-to-launch-multiple-apps-at-once-in-windows-7-with-a-single-shortcut, Jan. 9, 2012, pp. 1-10.

Nakodari, "Open Multiple Applications With a Single Click Instantly," accessed at http://web.archive.org/web/20130529094150/http://www.addictivetips.com/windows-tips/open-multiple-appl ications-with-a-single-click-instantly, Jan. 18, 2009, pp. 1-2.

* cited by examiner

MANAGING ASSOCIATED TASKS USING A TASK MANAGER IN COMMUNICATION DEVICES

CROSS-REFERENCE TO RELATED APPLICATION

This Application is the U.S. National Stage filing under 35 U.S.C. § 371 of International Application No. PCT/US13/48518, filed on Jun. 28, 2013.

BACKGROUND

As computer performance capabilities have increased, it has become possible to run multiple software programs simultaneously on a computing platform. A user may open several word processing documents, spreadsheets, web pages, message files, or PDF (portable document format) files simultaneously, to perform a certain task using his/her computer. Furthermore, the user may work on multiple tasks at the same time using the computer.

SUMMARY

In an example, a method performed under control of a task management system may include determining a relationship among multiple tasks executed on a first platform to identify one or more associated tasks; identifying at least one attribute, of each of the one or more associated tasks; generating a job that includes the one or more associated tasks and the identified at least one attribute of each of the one or more associated tasks; and instantiating, on a second platform, the one or more associated tasks included in the job based on the at least one attribute of each of the one or more associated tasks, in response to a request to launch the job.

In another example, a method performed under control of a task management system may include determining a relationship among multiple tasks executed on a platform to identify one or more associated tasks, and generating a job to include the identified one or more associated tasks.

In yet another example, a task management system may include a task relationship identification unit configured to determine a relationship among multiple tasks executed on a platform to identify one or more associated tasks, and a job generation unit configured to generate a job to include the one or more associated tasks identified by the task relationship identification unit.

In still another example, a computer-readable storage medium may store thereon computer-executable instructions that, in response to execution, cause a task management system to perform operations, including identifying one or more tasks that are associated with one another, and at least one attribute of each of the one or more associated tasks; generating a job to include the one or more associated tasks and the identified at least one attribute of each of the one or more associated tasks; and launching the one or more associated tasks included in the job based on the at least one attribute of each of the one or more associated tasks when a request is received to launch the job.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
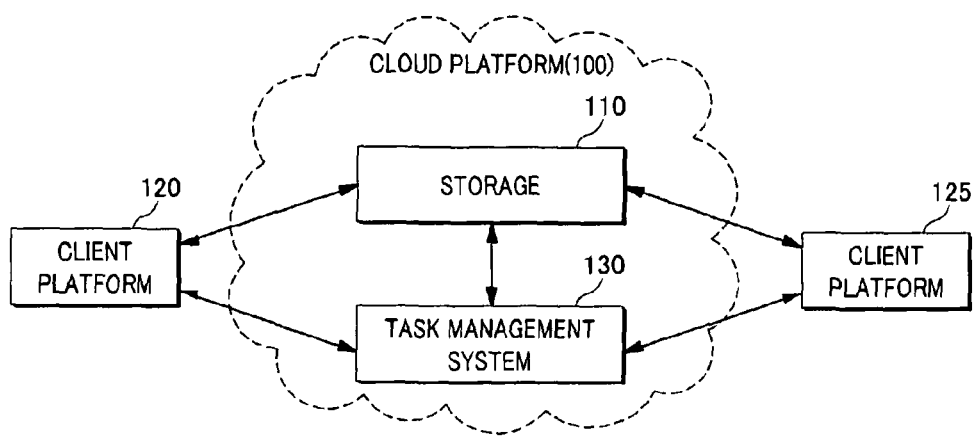
FIGS. 1A-C schematically show illustrative examples of environments for implementing a task management scheme, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a task management scheme. Further, technologies are herein generally described for generating a job to include one or more associated tasks from among multiple tasks executed on a platform, and launching, on the platform or another platform, the one or more associated tasks included in the job in response to a request to launch the job.

In some examples, a user may have a first platform execute multiple tasks. By way of example, but not limitation, the user may create and/or edit several word processing documents, spreadsheets, message files, etc., and open and read several web pages, PDF (portable document format) files, etc. with an office PC (personal computer), to prepare, e.g., an outline of a new strategy, prepare a revenue analysis report, and conduct a performance evaluation at once. Each of the tasks may refer to a file (e.g., a word processing document, a spreadsheet, a message file, a web page, or a PDF file, etc.), an application that executes the file (e.g., a word processor application, a spreadsheet application, an electronic mail application, a web browser, or a PDF viewer, etc.), and/or a file location/path indicating where the file is stored.

Further to the aforementioned examples, a task management system, which may be hosted by the first platform or another platform (e.g., a cloud platform), may identify one or more tasks that are associated with one another, and generate a job to include the identified one or more associated tasks. The task management system may identify the one or more tasks from among the several word processing documents, spreadsheets, message files, web pages, PDF files, etc., that may be associated with the new strategy, and generate one or more jobs related to the new strategy to include the identified tasks. The task management system may further identify the one or more associated tasks based on at least one of redundancy of contents among at least some of the multiple tasks executed on the first platform; detected switching of activity among the multiple tasks executed on the first platform; or relevancy of names, tags, indices or keywords of the multiple tasks executed on the first platform. Similarly, the task management system may also generate other jobs respectively related to the revenue analysis and the performance evaluation. Then, the task management system may store the one or more jobs into at least one of a remote storage (cloud, storage) communicatively connected to the first platform, a local storage of the first platform, or a local storage communicatively coupled to the first platform.

Still further to the aforementioned examples, when the user tries to continue working on the one or more jobs related to the new strategy on a second platform (e.g., home PC), the task management system may instantiate or launch, on the second platform, the one or more associated tasks included in the one or more generated jobs, so that the user experience on the second platform may be substantially the same as on the first platform (e.g., at home as in the office). The first platform and the second platform may be the same or different.

Yet further to the aforementioned examples, the task management system may identify at least one attribute of each of the one or more associated tasks, and generate the one or more jobs to further include the identified at least one attribute of each of the one or more associated tasks. Examples of the attribute of each of the one or more associated tasks may include, but are not limited to, a file location, a file link, a window position, a window size, a window depth, a pointer position, a scroll position, a viewing position, a bookmark, contents in a clipboard or contents in a corrective data buffer, associated with each of the one or more associated tasks.

In some other examples, the user may manually modify or edit the one or more jobs. In such cases, the task management system may update the one or more jobs.

FIG. 1A schematically shows an illustrative example of an environment for implementing a task management scheme, arranged in accordance with at least some embodiments described herein.

As depicted, a cloud platform 100 (i.e., a platform for cloud computing) including a storage 110 may provide multiple client platforms including a first client platform 120 and a second client platform 125 with a cloud service. Client platforms 120 and 125 may communicate with cloud platform 100 via a network such as, for example, the Internet, a cellular network, a wide area network (WAN), a metropolitan area network (MAN), a local area network (LAN), a campus area network (CAN), a virtual private network (VPN), etc. Client platforms 120 and/or 125 may be of any type of electronic device configured to store, retrieve, compute, transmit and/or receive data. Non-limiting examples of such platforms may include a smartphone, a mobile phone, a personal digital assistant (PDA), a tablet, a personal computer such as a laptop computer or a desktop computer, a television, a gaming console, etc. A user subscribed to the cloud service may have client platforms 120 and/or 125 access, manage and/or process data in storage 110.

In some embodiments, cloud platform 100 may further include or host a task management system 130. Task management system 130 may interact with storage 110, as well as client platforms 120 and 125, to implement the task management scheme with cloud platform 100 and client platforms 120 and 125.

In some embodiments, it may be assumed that the user may execute multiple tasks on first client platform 120, which may be communicatively connected to cloud platform 100, and store data files related to the multiple tasks in storage 110. Additionally and/or alternatively, the user may log onto cloud platform 100, via first client platform 120, and execute the multiple tasks on cloud platform 100 and store the data files related to the multiple tasks in storage 110. In such cases, task management system 130 may determine a relationship among the multiple tasks to identify one or more associated tasks. Task management system 130 may determine the relationship among the multiple tasks based on, for example, at least one of redundancy of contents among at least some of the multiple tasks; detected switching of activity among the multiple tasks; or relevancy of names, tags, indices or keywords of the multiple tasks. Then, in some embodiments, task management system 130 may generate a job to include the identified one or more associated tasks.

By way of example, but not limitation, it may be assumed that 28 tasks indicated in Table 1 below are executed simultaneously on first client platform 120 and/or cloud platform 100.

TABLE 1

| Task No. | Task |
| --- | --- |
| 1 | Strategy_2013.docx |
| 2 | Data_for_2013.xlsx |
| 3 | Strategy_2012_rev4.docx |
| 4 | Data_for_2012_rev3.xlsx |
| 5 | RE: direction_2013.msg |
| 6 | RE: [Urgent] 2013 planning.msg |
| 7 | Gartner report.pdf |
| 8 | http://kr.wsj.com/posts/2012/11/20/%EC%95 . . . |
| 9 | Analysis report_2012.docx |
| 10 | 1Qdata.xlsx |
| 11 | 2Qdata_rev2.xlsx |
| 12 | 3Qdata.xlsx |
| 13 | 4Q_prediction.xlsx |
| 14 | IR_2012_1H.pptx |
| 15 | Due date: Dec 12.msg |
| 16 | My data.msg |
| 17 | http://currency.google.com/2012/. . . |
| 18 | https://secure.marketdata.com/2012/09/. . . |
| 19 | 2012_review_form_Adam.docx |
| 20 | 2013_review_form_Adam.docx |

TABLE 1-continued

| Task No. | Task |
|---|---|
| 21 | Grade memo.txt |
| 22 | 2013_review_form_Hayden.docx |
| 23 | 2013_grade_guideline.docx |
| 24 | 2013_goal_Hayden.docx |
| 25 | 2012_team performance.xlsx |
| 26 | http://www.leadership.com/posts/. . . |
| 27 | Note for leader.pdf |
| 28 | What is Mentoring.epub |

In this example, task management system 130 may check whether some of contents are copied from a particular task to another task. For instance, when a portion of "1Qdata.xlsx" (Task 10) is copied to "Analysis report_2012.docx" (Task 9), task management system 130 may determine that Task 9 and Task 10 are associated with each other. Additionally and/or alternatively, task management system 130 may check which task is activated after activation of the particular task. For instance, when the user continuously switches between "RE: direction_2013.msg" (Task 5) and "strategy_2013.docx" (Task 1), or the user works with two windows associated with "RE: direction_2013.msg" (Task 5) and "strategy_2013.docx" (Task 1) are displayed at front, task management system 130 may determine that Task 1 and Task 5 are associated with each other. Additionally and/or alternatively, task management system 130 may compare file names, tags, indices or keywords of the multiple tasks. For instance, based on the similarity of file names of "2012_review_form_Adam.docx" (Task 19), "2013_review_form_Adam.docx" (Task 20), and "2013_review_form_Hayden.docx" (Task 22), task management system 130 may determine that Task 19, Task 20 and Task 22 are associated with one another. Hereinafter, it may be assumed that task management system 130 determines that Tasks 1 to 8 are associated with one another; Tasks 9 to 18 are associated with one another; and Tasks 19 to 28 are associated with one another; and task management system 130 may further generate Job 1 for Tasks 1 to 8, Job 2 for Tasks 9 to 18, and Job 3 for Tasks 19 to 28.

In some embodiments, task management system 130 may assign an identity to each of the generated jobs. By way of example, but not limitation, task management system 130 may determine a representative task from among the one or more associated tasks included in each of the jobs, and assign the identity based on, at least, the representative task.

For instance, when it is determined that the user mostly edits "Strategy_2013.docx" (Task 1) among Tasks 1 to 8 included in Job 1, task management system 130 may determine the representative task of Job 1 as Task 1, based on an assumption that the most edited tasks may be regarded as the representative task. Then, task management system 130 may assign an identity of "Strategy for 2013" to Job 1, based on the title of the representative task. In a similar manner, task management system 130 may assign an identity of "2012 Revenue Analysis" to Job 2, and an identity of "Performance Evaluation" to Job 3.

In some further embodiments, task management system 130 may identify at least one attribute of each of the one or more associated tasks included in the respective jobs. In such cases, the respective jobs may further include the identified at least one attribute of each of the one or more associated tasks. The attribute may include, but are not limited to, a file location, a file link, a window position, a window size, a window depth, a pointer position, a scroll position, a viewing position, a bookmark, and/or contents in a clipboard or contents in a corrective data buffer, associated with each of the one or more associated tasks.

For instance, when "strategy_2013.docx" (Task 1) is a 100-page document, and the user works on page 57, line 4, task management system 130 may identify the viewing position of Task 1 as page 57, line 4. Also, when the user displays "RE: direction_2013.msg" (Task 5) on the left top of the screen of first client platform 120, and "strategy_2013.docx" (Task 1) on the right bottom of the screen, task management system 130 may identify an absolute and/or relative positions of Tasks 1 and 5. Table 2 below illustrates an example of Job 1 generated by task management system 130.

TABLE 2

Job 1: Strategy for 2013

| Task No. | Application | Window position/size/depth | File location | Viewing position | Contents in corrective data buffer |
|---|---|---|---|---|---|
| 1 | Word processor | Absolute: position in pixel: 232, 324, size in pixel: 542, 300, displayed at front Relative: displayed with "RE: [Urgent] 2013 planning.msg" at front, left side | C:\My documents\ urgent\ | page 57, line 4 | Delete "so we need to carefully" |
| 2 | Spreadsheet | Absolute: position in pixel: 230, 300, size in pixel: 800, 430, displayed at 2nd forward Relative: back of "Strategy_2013.docx" | \network drive\John\ document\ | Sheet "Budget", column 5 | . . . |
| . . . | | | | | |
| 8 | Web browser | Full size window, displayed at back | N/A | 30% Scrolled to the bottom | N/A |

Then, in some embodiments, task management system 130 may cause the generated jobs to be stored in storage 110. In such cases, the user may use not only first client platform 120, but also second client platform 125, to continue working on the jobs by accessing cloud platform 100.

In some embodiments, when the user tries to work on one of the jobs stored in storage 110 via second client platform 125, the user may, launch the job or open one of the tasks in the job on second client platform 125, using, for example, a task management tool, which will be described below with reference to FIG. 2. In such cases, cloud platform 100 may receive, from second client platform 125, a request to launch the job, and task management system 130 may instantiate, on second client platform 125, the one or more associated tasks included in the job based on the at least one attribute of each of the one or more associated tasks.

For instance, when the user requests to launch "Strategy for 2013" (Job 1) on second client platform 125, task management system 130 may instantiate Tasks 1 to 8 on second client platform 125 based on the attributes illustrated in Table 2 above. That is, second client platform 125 may display eight windows associated with Tasks 1 to 8, based on the file locations, the file links, the window positions, the window sizes, the window depths, the pointer positions, the scroll positions, the viewing positions, the bookmarks, and/or the contents in the clipboard or the contents in the corrective data buffer, as previously identified and stored in storage 110. Additionally and/or alternatively, when second client platform 125 has different display size and/or resolution from first client platform 120, task management system 130 may modify the absolute window positions while preserving the relative window positions. Additionally and/or alternatively, when second client platform 125 has different operating system and/or applications for executing tasks, task management system 130 may launch, on second client platform 125, appropriate applications that may be different from the applications previously identified on first client platform 120 (e.g., Internet Explorer™ vs. Safari™, Microsoft Office™ vs. Polaris Office™, etc.).

In some further embodiments, when the user modifies at least one of the one or more tasks in the job on second client platform 125, task management system 130 may update the job stored in storage 110 to incorporate the modifications. Further, when the user modifies the job, task management system 130 may update the job stored in storage 110.

In some other embodiments, task management system 130 may synchronize the jobs across cloud platform 100, first client platform 120 and second client platform 125. For instance, task management system 130 may allow the user to select whether to synchronize the jobs, for example, by displaying one of client platforms 120 and 125 a window including Table 3 below.

TABLE 3

Which Job do you want to sync?

| Job | Previous Platform | Time |
| --- | --- | --- |
| Strategy for 2013 | Office PC | Jun. 19, 2013, 18:34:04 |
| Vacation Plan | Tablet | Jun. 19, 2013, 20:33:23 |
| 2012 Revenue Analysis | Office PC | Jun. 19, 2013, 14:20:03 |
| Performance Evaluation | Office PC | Jun. 19, 2013, 17:59:04 |
| Christmas Party | Smartphone | Jun. 19, 2013, 11:16:20 |

Figure 1B:
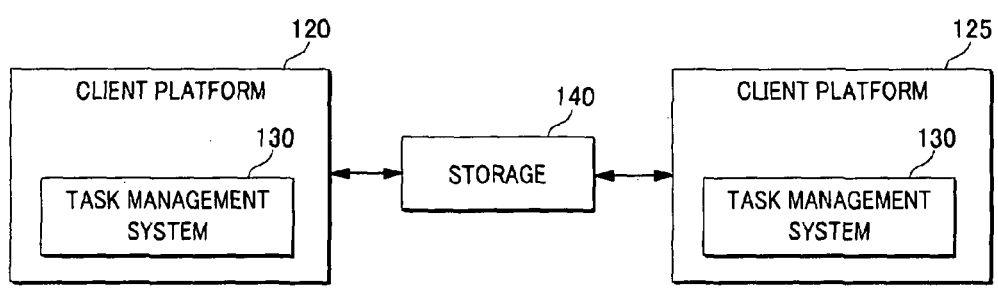

FIG. 1B schematically shows another illustrative example of an environment for implementing a task management scheme, arranged in accordance with at least some embodiments described herein.

Unlike the illustrative example in FIG. 1A, in the example embodiment of FIG. 1B, each of client platforms 120 and 125 may include task management system 130. In some embodiments, task management system 130 in first client platform 120 may determine a relationship among multiple tasks executed on first client platform 120 to identify one or more associated tasks, and generate a job to include the identified one or more associated tasks, in a similar manner as described with reference to FIG. 1A. Then, task management system 130 may store the generated job in a storage 140. Storage 140 may be a local storage that may be communicatively coupled to first client platform 120. Examples of storage 140 may include, but are not limited to, an external hard disk, a flash memory-based storage (e.g., memory stick, memory card, USB flash drive, etc.), an optical disc (e.g., CD, DVD, etc.), a floppy disc, or so on.

In some embodiments, when storage 140 is communicatively coupled to second client platform 125 and a user of second client platform 125 tries to launch the job or open one of the tasks in the job, task management system 130 in second client platform 125 may instantiate, on second client platform 125, the one or more associated tasks included in the job, in a similar manner as described with reference to FIG. 1A. Additionally and/or alternatively, when storage 140 is detached from first client platform 120 and then communicatively coupled to first client platform 120 again, task management system 130 in first client platform 120 may instantiate, on first client platform 120, the one or more associated tasks included in the job.

Figure 1C:
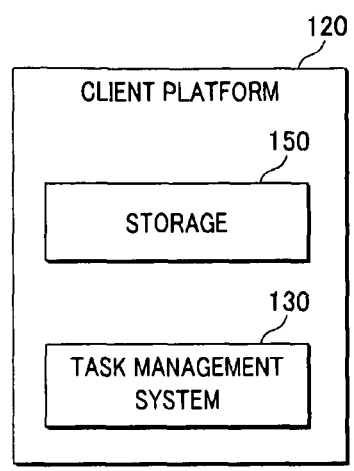

FIG. 1C schematically shows yet another illustrative example of an environment for implementing a task management scheme, arranged in accordance with at least some embodiments described herein.

Unlike the illustrative examples in FIGS. 1A and 1B, first client platform 120 may include task management system 130 and a storage 150. In some embodiments, task management system 130 in first client platform 120 may determine a relationship among multiple tasks executed on first client platform 120 to identify one or more associated tasks, and generate a job to include the identified one or more associated tasks, in a similar manner as described with reference to FIG. 1A. Then, task management system 130 may store the generated job in storage 150, which may be a local storage in first client platform 120 including, but not limited to, a hard-disk drive (HDD).

In some embodiments, when a user of first client platform 120 tries to launch the job or open one of the tasks in the job at a later time, task management system 130 in first client platform 120 may instantiate, on first client platform 120, the one or more associated tasks included in the job, in a similar manner as described with reference to FIG. 1A.

Figure 2:
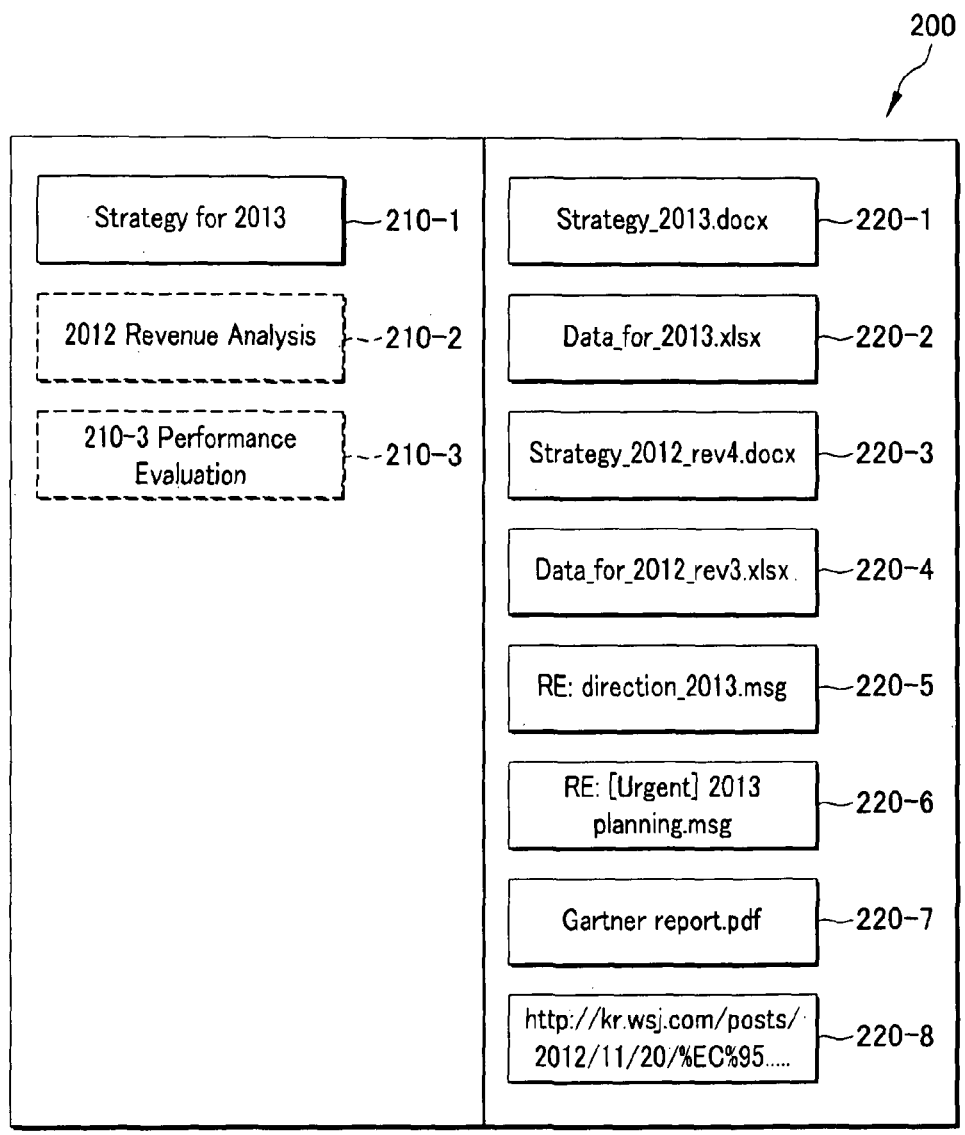
FIG. 2 schematically shows an illustrative example of a task management tool, arranged in accordance with at least some embodiments described herein.

FIG. 2 schematically shows an illustrative example of a task management tool 200, arranged in accordance with at least some embodiments described herein. Reference may be made to the embodiments depicted and described with reference to FIGS. 1A-1C.

In some embodiments, task management tool 200 may be displayed on client platform 120 or 125 (illustrated in FIGS. 1A-1C), so that a user of client platform 120 or 125 may launch one or more tasks included in a job and/or modify the job on client platform 120 or 125.

As depicted, task management tool 200 may present a list of job icons 210-1, 210-2 and 210-3 in a left column. When the user selects (e.g., clicks) job icon 210-1 from among job icons 210-1, 210-2 and 210-3, task management tool 200 may present, in a right column, a list of task icons 220-1, 220-2, 220-3, 220-4, 220-5, 220-6, 220-7 and 220-8 representing multiple tasks included in a job represented by job icon 210-1. Although FIG. 2 illustrates that task management tool 200 presents the list of job icons 210-1, 210-2 and 210-3 in the left column and the list of task icons 220-1, 220-2, 220-3, 220-4, 220-5, 220-6, 220-7 and 220-8 in the right column (i.e., in a left-right configuration), those skilled in the art will readily appreciate that task management tool 200 may have any configuration, including, for example, an upper-lower configuration, etc.

By way of example, but not limitation, when the user begins to launch the job represented by job icon 210-1, the user may select (e.g., double-click) job icon 210-1, or one of task icons 220-1, 220-2, 220-3, 220-4, 220-5, 220-6, 220-7 and 220-8. By way of another example, but not limitation, when the user wants to move a task represented by task icon 220-8 from under the job represented by job icon 210-1 to under a job represented by job icon 210-2, the user may drag and drop task icon 220-8 to job icon 210-2.

Figure 3:
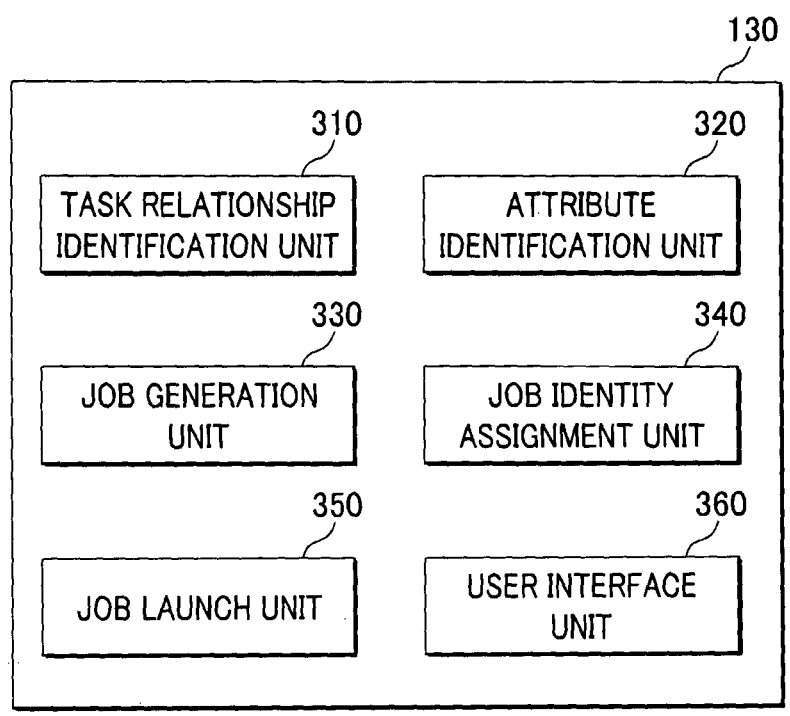
FIG. 3 shows a schematic block diagram illustrating an example architecture of a task management system, arranged in accordance with at least some embodiments described herein.

FIG. 3 shows a schematic block diagram illustrating an example architecture of task management system 130, arranged in accordance with at least some embodiments described herein. Reference may be made to the embodiments depicted and described with reference to FIGS. 1-2.

As depicted, task management system 130 may include a task relationship identification unit 310, an attribute identification unit 320, a job generation unit 330, a job identity assignment unit 340, a job launch unit 350, and a user interface unit 360. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Task relationship identification unit 310 may be configured to determine a relationship among multiple tasks executed on a platform (e.g., cloud platform 100 or client platform 120 or 125 illustrated in FIGS. 1A-1C) to identify one or more associated tasks. In some embodiments, task relationship identification unit 310 may be further configured to determine the relationship based on at least one of redundancy of contents of the multiple tasks executed on the platform; detected switching of activity among at least some of the multiple tasks executed on the platform; or relevancy of names, tags, indices or keywords of the multiple tasks executed on the platform.

Attribute identification unit 320 may be configured to identify at least one attribute of each of the one or more associated tasks identified by task relationship identification unit 310. By way of example, but not limitation, the at least one attribute of each of the one or more associated tasks may include at least one of a file location, a file link, a window position, a window size, a window depth, a pointer position, a scroll position, a viewing position, a bookmark, contents in a clipboard or contents in a corrective data buffer, associated with each of the one or more associated tasks.

Job generation unit 330 may be configured to generate a job to include the one or more associated tasks identified by task relationship identification unit 310. In some embodiments, job generation unit 330 may be further configured to generate the job to further include the at least one attribute of each of the one or more associated tasks identified by attribute identification unit 320.

Job identity assignment unit 340 may be configured to determine a representative task from among the one or more associated tasks included in the job, and to assign an identity to the generated job based on, at least, the determined representative task.

Job launch unit 350 may be configured to instantiate, on the platform, the one or more associated tasks included in the job, in response to a request to launch the job on the platform, and/or transmit the job to another platform when a request is received to launch the job on the other platform.

User interface unit 360 may be configured to detect a user input to launch the job and/or modify the job. In some embodiments, user interface unit 360 may be configured to detect the user input via task management tool 200 (as illustrated in FIG. 2).

In some embodiments, job generation unit 330 may be further configured to update the job based on, at least, the user input received by user interface unit 360. In some further embodiments, job generation unit 330 may be further configured to update the job when a modification is made to the job and/or the one or more associated tasks included in the job.

Figure 4:
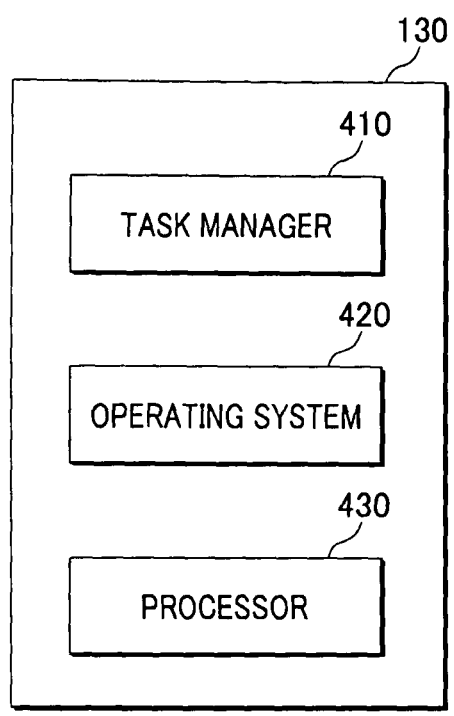
FIG. 4 shows a schematic block diagram illustrating another example architecture of a task management system, arranged in accordance with at least some embodiments described herein.

FIG. 4 shows a schematic block diagram illustrating another example architecture of task management system 130, arranged in accordance with at least some embodiments described herein. Reference may be made to the embodiments depicted and described with reference to FIGS. 1-3.

As depicted, task management system 130 may include a task manager 410, an operating system 420 and a processor 430. Task manager 410 may be an application adapted to operate on operating system 420 such that the task management scheme, as described herein, may be provided. Operating system 420 may allow task manager 410 to manipulate processor 430 to implement the task management scheme as described herein.

In some embodiments, task manager 410 may include one or more components or program modules respectively adapted to implement functions of task relationship identification unit 310, attribute identification unit 320, job generation unit 330, job identity assignment unit 340, job launch unit 350, and user interface unit 360 as illustrated in FIG. 3.

Figure 5:
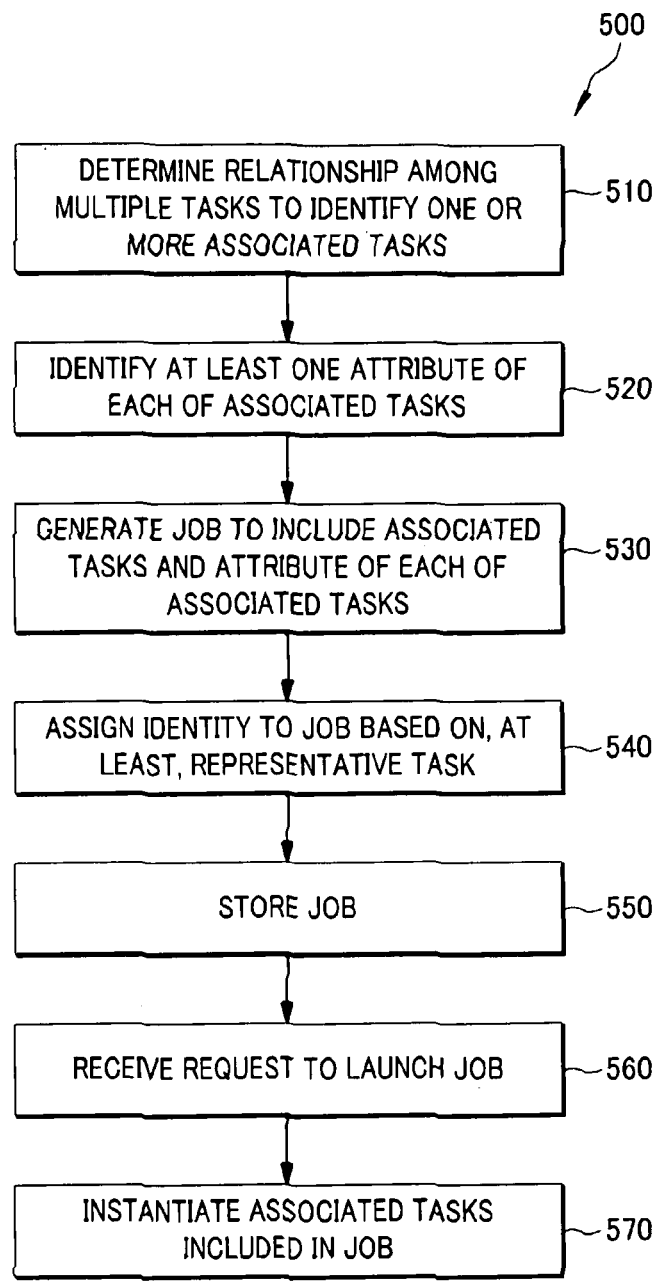
FIG. 5 shows an example flow diagram of a process for implementing a task management scheme, arranged in accordance with at least some embodiments described herein.

FIG. 5 shows an example flow diagram of a process 500 for implementing a task management scheme, arranged in accordance with at least some embodiments described herein.

Process 500 may be implemented in a task management system such as task management system 130 including task relationship identification unit 310, attribute identification unit 320, job generation unit 330, job identity assignment unit 340, job launch unit 350, and user interface unit 360. Process 500 may also be implemented by computer programs or program modules that are adapted to provide the task management scheme and hosted by a platform, such as task manager 410. Thus, reference may be made to the embodiments depicted and described with reference to FIGS. 1-4. Process 500 may include one or more operations, actions, or functions as illustrated by one or more blocks 510, 520, 530, 540, 550, 560 and/or 570. Although illustrated as discrete blocks, various blocks may be divided into additional blocks, combined into fewer blocks, or eliminated, depending on the desired implementation. Processing may begin at block 510.

At block 510 (Determine Relationship Among Multiple Tasks To Identify One Or More Associated Tasks), task management system 130 (e.g., task relationship identification unit 310) and/or task manager 410 may determine a relationship among multiple tasks executed on a platform (e.g., cloud platform 100 or client platform 120 or 125 illustrated in FIGS. 1A-1C) to identify one or more associated tasks. In some embodiments, task management system 130 and/or task manager 410 may determine the relationship based on at least one of redundancy of contents of the multiple tasks executed on the platform; detected switching of activity among the multiple tasks executed on the platform; or relevancy of names, tags, indices or keywords of the multiple tasks executed on the platform. Processing may continue from block 510 to block 520.

At block 520 (Identify At Least One Attribute Of Each Of Associated Tasks), task management system 130 (e.g., attribute identification unit 320) and/or task manager 410 may identify at least one attribute of each of the one or more associated tasks. By way of example, but not limitation, the at least one attribute of each of the one or more associated tasks may include at least one of a file location, a file link, a window position, a window size, a window depth, a pointer position, a scroll position, a viewing position, a bookmark, contents in a clipboard or contents in a corrective data buffer, associated with each of the one or more associated tasks. Processing may continue from block 520 to block 530.

At block 530 (Generate Job To Include Associated Tasks And Attribute Of Each Of Associated Tasks), task management system 130 (e.g., job generation unit 330) and/or task manager 410 may generate a job to include the identified one or more associated tasks and the identified at least one attribute of each of the one or more associated tasks. Processing may continue from block 530 to block 540.

At block 540 (Assign Identity To Job Based On, At Least, Representative Task), task management system 130 (e.g., job identity assignment unit 340) and/or task manager 410 may assign an identity to the generated job based on, at least, a representative task from among the one or more associated tasks included in the job. By way of example, but not limitation, task management system 130 and/or task manager 410 may determine the representative task as the most edited task from among the one or more associated tasks included in the job. Processing may continue from block 540 to block 550.

At block 550 (Store Job), task management system 130 and/or task manager 410 may store the job into at least one of a remote storage communicatively connected to the platform (e.g., storage 110 in FIG. 1A), a local storage communicatively coupled to the platform (e.g., storage 140 in FIG. 1B), or a local storage of the platform (e.g., storage 150 in FIG. 1C). Processing may continue from block 550 to block 560.

At block 560 (Receive Request To Launch Job), task management system 130 (e.g., user interface unit 360) and/or task manager 410 may receive, from the platform or from another platform, a request to launch the job. By way of example, but not limitation, task management system 130 and/or task manager 410 may receive the request via task management tool 200 (as illustrated in FIG. 2). Processing may continue from block 560 to block 570.

At block 570 (Instantiate Associated Tasks Included In Job), task management system 130 (e.g., job launch unit 350) and/or task manager 410 may instantiate, on the platform, the one or more associated tasks included in the job, in response to the request to launch the job; and/or transmit the job to another platform when a request is received to launch the job on the other platform, so that the one or more associated tasks may be instantiated on the other platform.

As such, task management system 130 and/or task manager 410 may implement a task management scheme that may enable generation of a job including one or more tasks that are associated with one another, and synchronization and automatic launching of the associated tasks under the job across multiple platforms, thereby allowing a user to work in a virtually same working environment using any platform at any location in the world.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
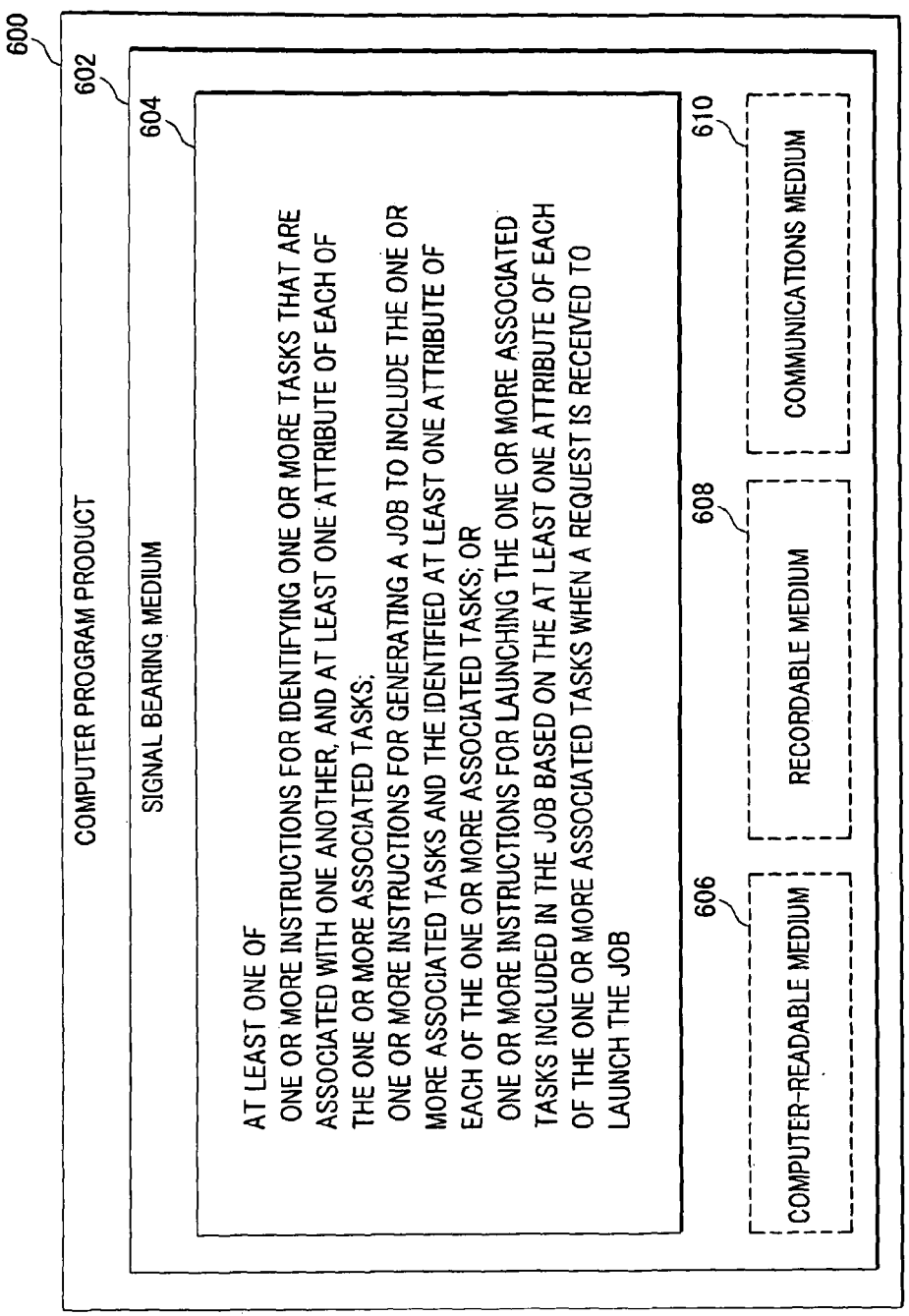
FIG. 6 illustrates an example computer program product that may be utilized to implement a task management scheme, arranged in accordance with at least some embodiments described herein.

FIG. 6 illustrates an example computer program product 600 that may be utilized to implement a task management scheme, arranged in accordance with at least some embodiments described herein.

As depicted, program product 600 may include a signal bearing medium 602. Signal bearing medium 602 may include one or more instructions 604 that, when executed by, for example, task management system 130, may provide the functionality described above with respect to FIGS. 1-5. By way of example, instructions 604 may include: one or more instructions for identifying one or more tasks that are associated with one another, and at least one attribute of each of the one or more associated tasks; one or more instructions for generating a job to include the one or more associated tasks and the identified at least one attribute of each of the one or more associated tasks; or one or more instructions for launching the one or more associated tasks included in the job based on the at least one attribute of each of the one or more associated tasks when a request is received to launch the job.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, program product 600 may be conveyed to one or more modules of task management system 130 by an RF signal bearing medium 602, where the signal bearing medium 602 is conveyed by a wireless communications medium 610 (e.g., a wireless communications medium conforming with the IEEE 802.11 standard).

Figure 7:
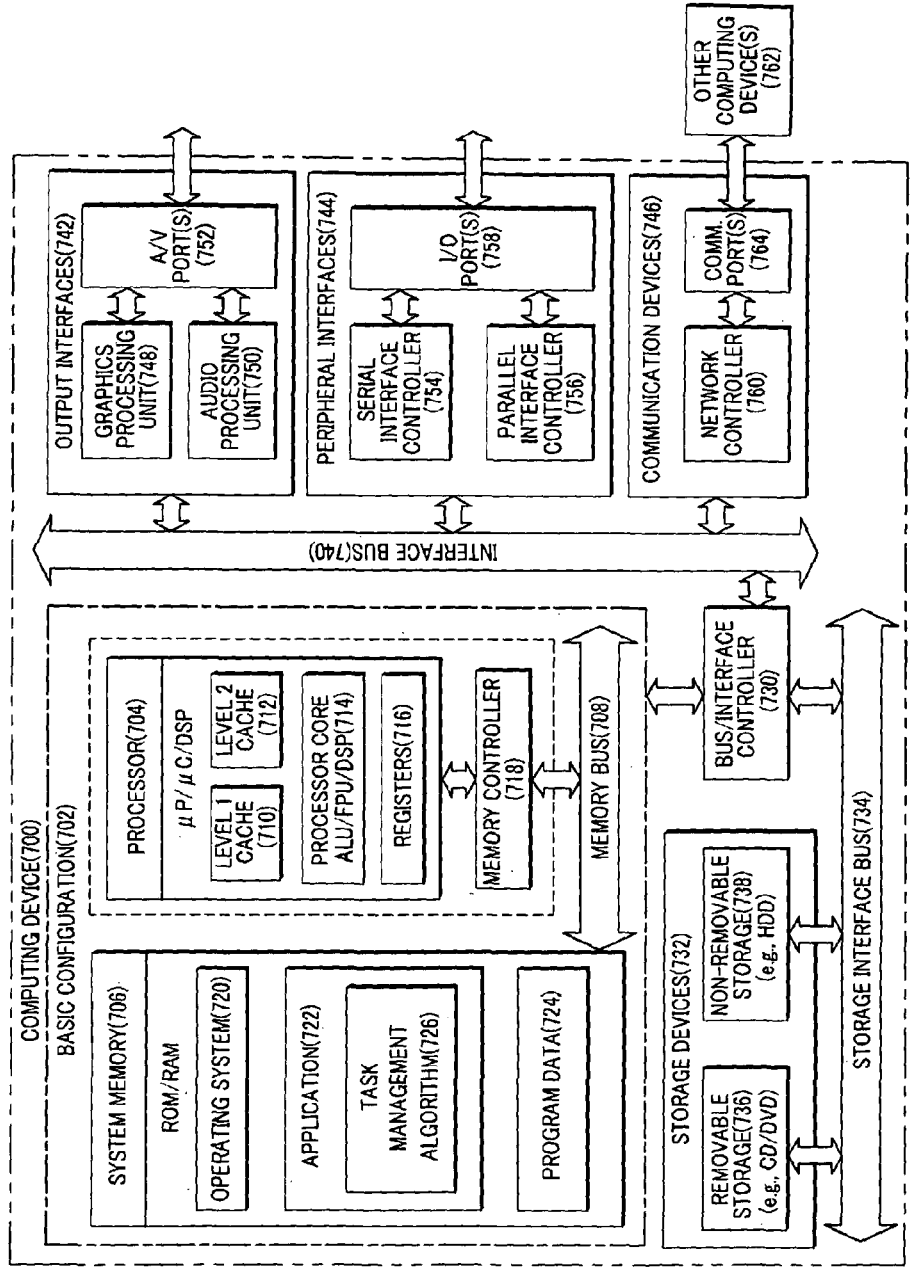
FIG. 7 is a block diagram illustrating an example computing device that may be utilized to implement a task management scheme, arranged in accordance with at least some embodiments described herein.
Figure 7:
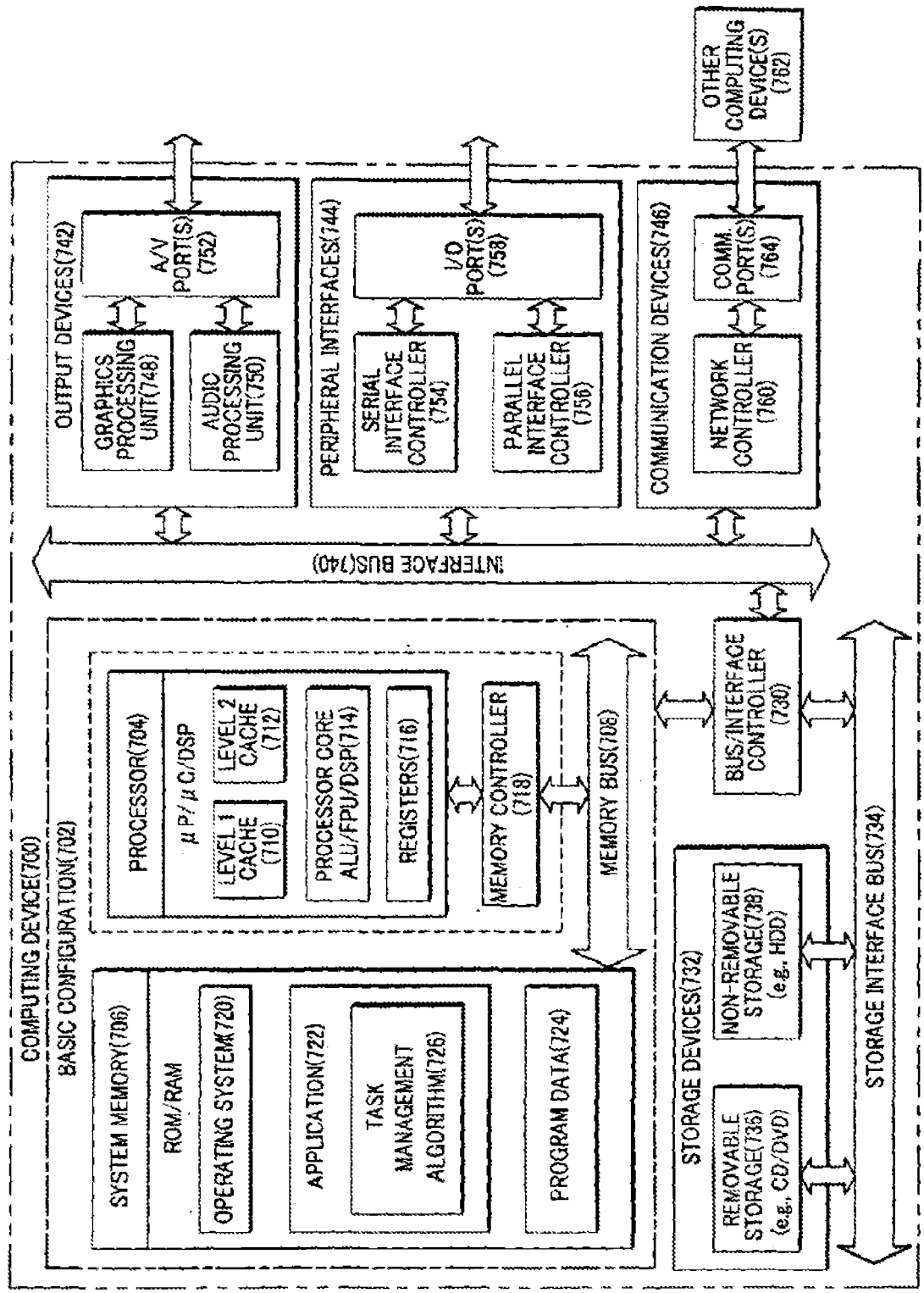

FIG. 7 is a block diagram illustrating an example computing device 700 that may be utilized to implement a task management scheme, arranged in accordance with at least some embodiments described herein.

In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), nonvolatile memory (such as ROM, flash memory, etc.) or any combination thereof. System memory 706 may include an operating system 720, one or more applications 722, and program data 724.

Application 722 may include a task management algorithm 726 that may be arranged to perform the functions as described herein including the actions described with respect to the task management system 130 architecture as shown in FIGS. 3-4 or including the actions described with respect to the flow chart shown in FIG. 5. Program data 724 may include any data that may be useful for providing the task management scheme as is described herein. In some examples, application 722 may be arranged to operate with program data 724 on an operating system 720 such that the task management scheme as described herein may be provided.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a task management system, the method comprising:
    generating a job that includes:
        one or more associated tasks simultaneously being executed on a first operating system that operates on a first device, and
        at least one attribute of each of the one or more associated tasks;
    assigning an identity to the generated job based on a title of a representative task, wherein the representative task includes a task, among the one or more associated tasks, that includes content that is edited most as compared to contents of other tasks of the one or more associated tasks; and
    in response to the assignment of the identity to the job and in response to a request received from a second operating system that operates on a second device to launch the job on the second operating system, instantiating, on the second operating system, the one or more associated tasks included in the job based on the at least one attribute of each of the one or more associated tasks.

2. The method of claim 1, wherein the first operating system and the second operating system are different from each other.

3. A method performed under control of a task management system, the method comprising:
    generating a job to include one or more associated tasks simultaneously being executed on a first operating system that operates on a first device, wherein the generating comprises determining a relationship among the one or more associated tasks, and wherein the determining the relationship is performed based on detected switching of activity among the one or more associated tasks executed on the first operating system;
    assigning an identity to the generated job based on a title of a representative task, wherein the representative task includes a task, among the one or more associated tasks, that includes content that is edited most as compared to contents of other tasks of the one or more associated tasks; and
    transmitting the generated job with the assigned identity to another operating system that operates on another device in response to a received request to launch the job on the another operating system.

4. The method of claim 3, wherein the determining the relationship is further performed based on at least one of:
    redundancy of contents of the one or more associated tasks currently being executed on the first operating system; or
    relevancy of names, tags, indices, or keywords of the one or more associated tasks currently being executed on the first operating system.

5. The method of claim 3, further comprising:
    storing the job into at least one of a remote storage communicatively coupled to the first operating system, a local storage of the first operating system, or a local storage communicatively coupled to the first operating system.

6. The method of claim 3, further comprising:
    instantiating, on the first operating system and in response to a request to launch the job on the first operating system, the one or more associated tasks included in the job.

7. The method of claim 6, further comprising:
    updating the job after a modification to the job is made on the first operating system.

8. The method of claim 3, further comprising:
updating the job after a modification to the job is made on the another operating system.

9. The method of claim 3, wherein the task management system is hosted by the first operating system.

10. The method of claim 3, wherein the task management system is hosted by the another operating system, and wherein the another operating system is communicatively coupled to the first operating system.

11. The method of claim 3, wherein the first operating system and the another operating system are different from each other.

12. A task management system, comprising:
a processor; and
a memory coupled to the processor and configured to store components executable by the processor, the executable components comprising:
a task relationship identification unit configured to identify one or more associated tasks that are simultaneously executed on a first operating system, wherein the task relationship identification unit is further configured to determine a relationship among the one or more associated tasks based on detected switching of activity among the one or more associated tasks that are simultaneously executed on the first operating system;
a job generation unit configured to generate a job to include the one or more associated tasks identified by the task relationship identification unit;
a job identity assignment unit configured to assign, based on a title of a representative task, an identity to the job generated by the job generation unit, wherein the representative task includes a task, among the one or more associated tasks, that includes content that is edited most as compared to contents of other tasks of the one or more associated tasks; and
a job launch unit configured to:
in response to the assignment of the identity to the job and in response to a request to launch the job on the first operating system, instantiate, on the first operating system, the one or more associated tasks included in the job; and
transmit the job to another operating system in response to a request received from the another operating system to launch the job on the another operating system, wherein the another operating system operates on another device.

13. The task management system of claim 12, wherein the task relationship identification unit is configured to determine the relationship among the one or more associated tasks further based on at least one of:
redundancy of contents of the one or more associated tasks that are currently executed on the first operating system; or
relevancy of names, tags, indices, or keywords of the one or more associated tasks that are currently executed on the first operating system.

14. The task management system of claim 12, wherein the executable components further comprise:
an attribute identification unit configured to identify at least one attribute of each of the one or more associated tasks identified by the task relationship identification unit,
wherein the job generation unit is configured to generate the job to further include the at least one attribute of each of the one or more associated tasks identified by the attribute identification unit.

15. The task management system of claim 14, wherein the at least one attribute of each of the one or more associated tasks comprises at least one of: a file location, a file link, a window position, a window size, a window depth, a pointer position, a scroll position, a viewing position, a bookmark, contents in a clipboard, or contents in a corrective data buffer, associated with each of the one or more associated tasks.

16. The task management system of claim 12, further comprising:
a user interface unit configured to receive a user input to modify the job,
wherein the job generation unit is further configured to update the job based on, at least, the user input received by the user interface unit.

17. The task management system of claim 12, wherein the job generation unit is further configured to update the job in response to a modification made to the job.

18. The task management system of claim 12, wherein the first operating system and the another operating system are different from each other.

19. A non-transitory computer-readable storage medium having stored thereon computer-executable instructions that, in response to execution, cause a task management system to perform or control performance of operations to:
identify a first task and a second task that are associated with each other, and at least one attribute of each of the first task and the second task, wherein the first task and the second task are simultaneously being executed on a first operating system, and
wherein the identification of the first task and the second task that are associated with each other is based on a determination that content is copied from one of the first task and the second task to other of the first task and the second task;
generate a job to include the first task and the second task, and the identified at least one attribute of each of the first task and the second task;
assign an identity to the job based on a title of one of the first task and the second task, wherein the one of the first task and the second task includes content that is edited most as compared to other of the first task and the second task;
launch the first task and the second task included in the job based on the at least one attribute of each of the first task and the second task;
in response to a request to launch the job on the first operating system that operates on a first device, instantiate, on the first operating system, the first task and the second task included in the job; and
transmit the job to another operating system that operates on another device in response to a request to launch the job on the another operating system,
wherein the first operating system and the another operating system are different from each other.

* * * * *

UNITED STATES PATENT AND TRADEMARK OFFICE
CERTIFICATE OF CORRECTION

| | |
|---|---|
| PATENT NO. | : 9,934,075 B2 |
| APPLICATION NO. | : 14/375902 |
| DATED | : April 3, 2018 |
| INVENTOR(S) | : Jung |

Page 1 of 3

It is certified that error appears in the above-identified patent and that said Letters Patent is hereby corrected as shown below:

In the Drawings

In Fig. 7, Sheet 8 of 8, for Tag "(742)", Line 1, delete "OUTPUT INTERFACES(742)" and insert -- OUTPUT DEVICES(742) --, therefor. (See attached)

In the Specification

In Column 1, Line 30, delete "attribute, of" and insert -- attribute of --, therefor.

In Column 3, Line 33, delete "(cloud, storage)" and insert -- (cloud storage) --, therefor.

In Column 6, Line 65, delete "may, launch" and insert -- may launch --, therefor.

In Column 12, Line 11, delete "program product 600" and insert -- Computer program product 600 --, therefor.

In Column 12, Line 29, delete "a hard disk drive, a CD, a DVD," and insert -- a hard disk drive (HDD), a compact disc (CD), a digital versatile disc (DVD), --, therefor.

In Column 12, Line 37, delete "wired communications" and insert -- wired communication --, therefor.

In Column 12, Line 38, delete "program product 600" and insert -- Computer program product 600 --, therefor.

In Column 12, Lines 63-64, delete "implementations memory" and insert -- implementations, memory --, therefor.

In Column 14, Line 59, delete "recitation no" and insert -- recitation, no --, therefor.

In Column 15, Line 15, delete "general such" and insert -- general, such --, therefor.

Signed and Sealed this
Fifth Day of June, 2018

Andrei Iancu
*Director of the United States Patent and Trademark Office*

In Column 15, Line 22, delete "general such" and insert -- general, such --, therefor.